United States Patent
Marais et al.

(10) Patent No.: US 12,449,999 B2
(45) Date of Patent: Oct. 21, 2025

(54) SYSTEM AND METHOD FOR DATA MIGRATION

(71) Applicant: RIA Advisory LLC, Coral Gables, FL (US)

(72) Inventors: Andre Marais, Lake Zurich, IL (US); Saket Pabby, Coral Gables, FL (US); Supriya Mukhapadhyay, Naperville, IL (US)

(73) Assignee: RIA Advisory LLC, Coral Gables, FL (US)

( * ) Notice: Subject to any disclaimer, the term of this patent is extended or adjusted under 35 U.S.C. 154(b) by 0 days.

(21) Appl. No.: 17/062,294

(22) Filed: Oct. 2, 2020

(65) Prior Publication Data

US 2022/0107746 A1 Apr. 7, 2022

(51) Int. Cl.
*G06F 3/06* (2006.01)

(52) U.S. Cl.
CPC .......... *G06F 3/0647* (2013.01); *G06F 3/0626* (2013.01); *G06F 3/067* (2013.01)

(58) Field of Classification Search
CPC ....... G06F 3/0647; G06F 3/0626; G06F 3/067
See application file for complete search history.

(56) References Cited

U.S. PATENT DOCUMENTS

| | | | | |
|---|---|---|---|---|
| 7,962,513 B1* | 6/2011 | Boles | ...................... | H04L 63/20 707/781 |
| 2003/0202606 A1* | 10/2003 | Tinker | ................... | H04N 19/61 375/240.27 |
| 2006/0293861 A1* | 12/2006 | Askenazi | ............ | H01J 49/0036 702/22 |
| 2009/0125667 A1* | 5/2009 | Hatasaki | .................. | G11C 5/14 711/6 |
| 2013/0107889 A1* | 5/2013 | Barabash | ................ | H04L 45/64 370/409 |
| 2013/0339647 A1* | 12/2013 | Jindo | ..................... | G06F 3/0647 711/E12.103 |
| 2014/0059166 A1* | 2/2014 | Mann | .................. | H04N 21/4728 709/217 |
| 2016/0110298 A1* | 4/2016 | Koufaty | .................. | G06F 21/52 726/28 |
| 2016/0249079 A1* | 8/2016 | Malone | .......... | H04N 21/234309 |
| 2017/0371570 A1* | 12/2017 | Wokhlu | ................ | G06F 12/084 |
| 2018/0018444 A1* | 1/2018 | Rahme | .................... | H04L 67/12 |
| 2018/0095902 A1* | 4/2018 | Lemay | ................ | G06F 12/1466 |
| 2018/0338166 A1* | 11/2018 | Amiga | ............... | H04N 21/6125 |
| 2019/0020909 A1* | 1/2019 | Petajan | .......... | H04N 21/234381 |
| 2020/0351091 A1* | 11/2020 | Gardner | ................ | G06F 9/5027 |
| 2021/0034372 A1* | 2/2021 | Yates | .................... | G06F 9/3836 |

* cited by examiner

*Primary Examiner* — Prasith Thammavong
(74) *Attorney, Agent, or Firm* — Terrile, Cannatti & Chambers, LLP; Emmanuel A. Rivera

(57) ABSTRACT

A data integration hub system and method is provided for migrating data from one or more source systems to a selection of target systems. Data migration is provided by a library of executable modules that are configured to transform input data to a form appropriate for a target data repository. The input data is made agnostic to the nature of the source of the data through a source bridge that is configured to access data from a variety of sources and convert the accessed data to a format acceptable to the executable modules. Embodiments also provide a mechanism for customizing the data integration hub by providing multiple development layers and restricting access to those layers.

11 Claims, 6 Drawing Sheets

SYSTEM AND METHOD FOR DATA MIGRATION

BACKGROUND

Field

This disclosure relates generally to information handling systems, and more specifically, to an information handling system configured to agnostically access data from a variety of sources and modify that data for selected target systems.

Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The differences between information handling systems, and the differences of uses for the systems and the data therein, result in a wide variety of data formats and mechanisms to access that data. As time goes by, business enterprises utilizing such information handling systems may decide to utilize newer technology or new software systems to organize and access the enterprise's data. To do so, the data stored in legacy systems being migrated away from must be accessed and converted to a format acceptable to the new system and software. Traditionally, specialized data migration systems have been made that are configured to access the enterprise's specific data to modify that data for inclusion in the new system. This includes tasks such as, for example, shifting from one database system to another, putting data in new fields, new formats, and new combinations of data. The data migration system itself has had to be subjected to validation to ensure that data is being migrated properly and can handle a significant variety of data scenarios encountered during the migration. Creating and validating these specialized data migration systems consumes a significant amount of resources in time, personnel, and money.

BRIEF DESCRIPTION OF THE DRAWINGS

Embodiments of the present invention may be better understood by referencing the accompanying drawings.

The use of the same reference symbols in different drawings indicates identical items unless otherwise noted. The figures are not necessarily drawn to scale.

DETAILED DESCRIPTION

Embodiments of the present invention provide a data integration hub system and method for migrating data from one or more source systems to a selection of target systems. Data migration is provided by a library of executable modules that are configured to transform input data to a form appropriate for a target data repository. The input data is made agnostic to the nature of the source of the data through a source bridge that is configured to access data from a variety of sources and convert the accessed data to a format acceptable to the executable modules. Embodiments also provide a mechanism for customizing the data integration hub by providing multiple development layers and restricting access to those layers.

Embodiments of the data integration hub can be implemented through use of an information handling system configured to provide the functional aspects of the data integration hub, including, for example, communication, processing, and storage. Embodiments of the data integration hub can be configured to communicate with one or more data source servers via network connections. The data source servers store information desired to be provided to the data integration hub for inclusion in one or more data target servers. Embodiments of the data integration hub can also be configured to communicate with the one or more data target servers, providing the information to the data target servers in a form required by the data target servers.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
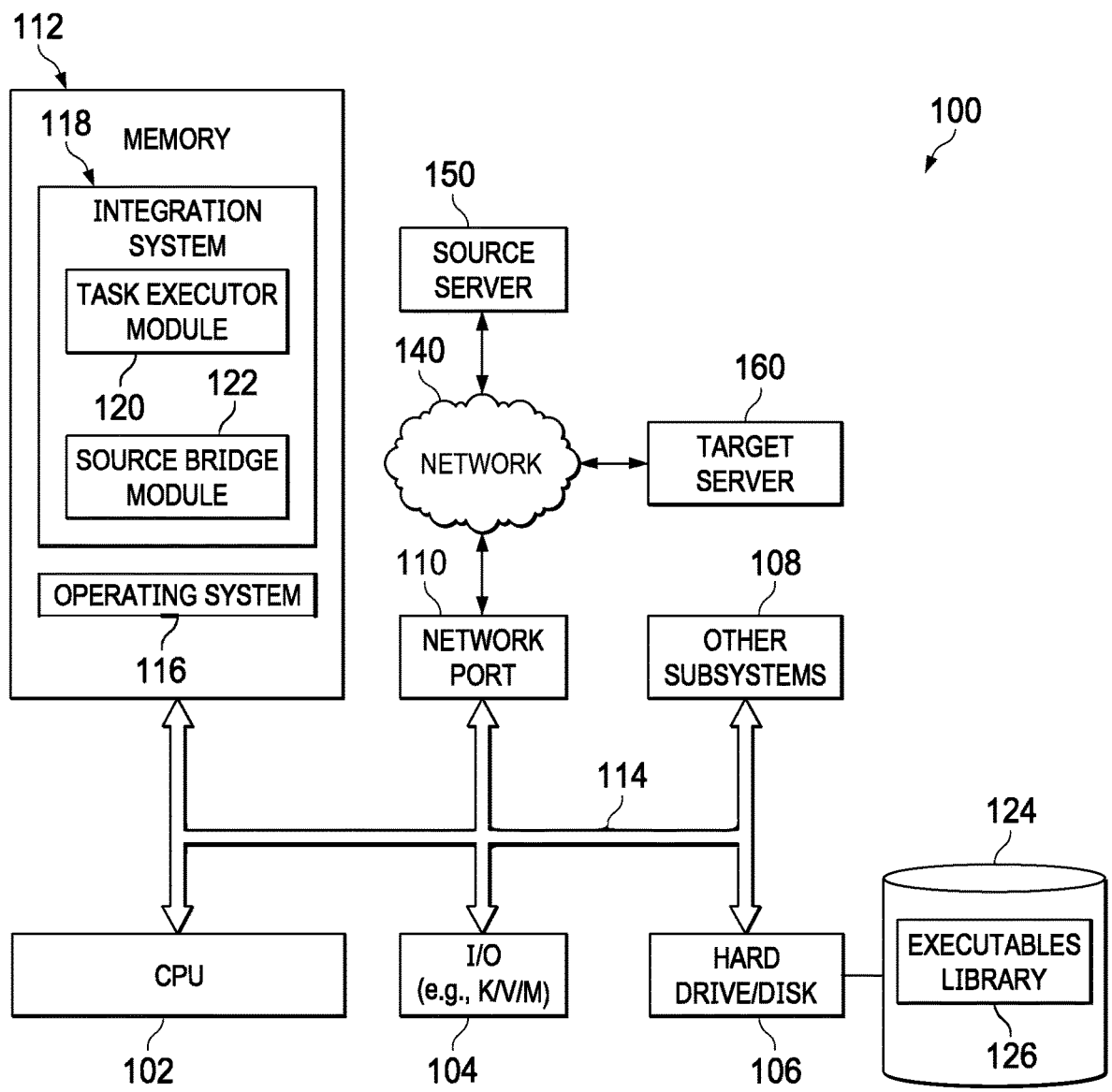
FIG. 1 is a generalized illustration of an information handling system 100 that can be used to implement the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage controller 106, and various other subsystems 108. In various embodiments, the information handling system 100 also includes network port 110 operable to connect to a network 140, which is likewise accessible by a data source server 150 and a data target server 160. The information handling system 100 likewise includes system memory 112, which is interconnected to the foregoing via one or more buses 114. System memory 112 further comprises operating system (OS) 116 and in various embodiments may also comprise integration system module 118.

Integration system module 118 performs operations associated with migration of data from one or more data source servers (e.g., source server 150) to one or more data target servers (e.g., target server 160). Integration system module 118 includes a task executor module 120 and a source bridge module 122. Task executor module 120 is configured to execute operations associated with one or more executables that are stored in an executables library 126 stored in a hard drive memory 124 controlled by hard drive/disk storage controller 106. Source bridge module 122 is configured to access data stored in a data source server using appropriate commands for such access and then providing the accessed data to task executor module 120 in a format and location expected by the running executable.

As will be appreciated, once the information handling system 100 is configured to perform data migration operations, the information handling system 100 becomes a specialized computing device specifically configured to perform data migration and is not a general-purpose computing device. Moreover, the implementation of the data migration operation on the information handling system 100 provides a useful and concrete result of moving enterprise-related information to a desired system in a format usable by that system.

Figure 2:
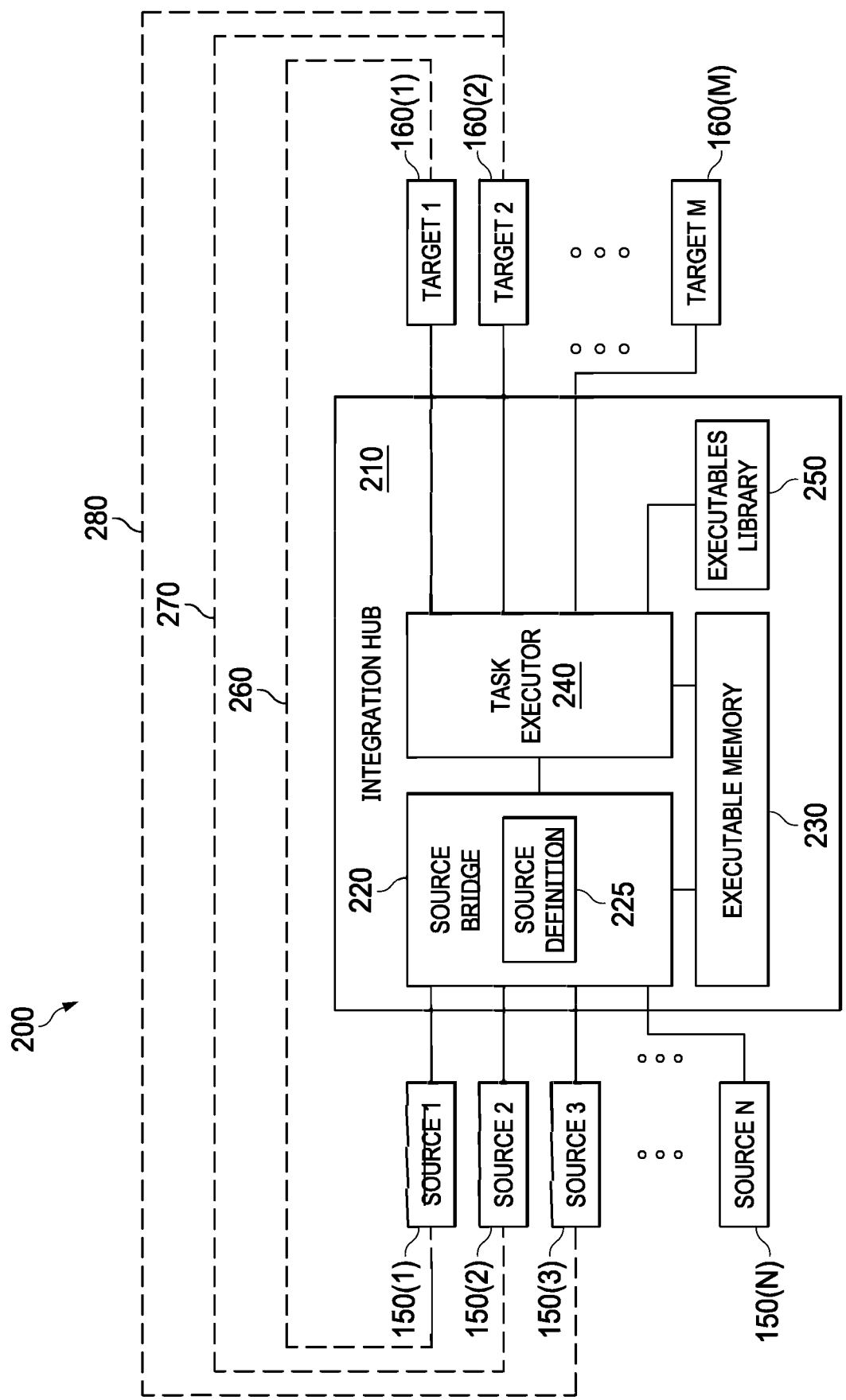
FIG. 2 is a simplified block diagram illustrating a data migration network 200 incorporating an integration hub 210 that is in accord with embodiments of the present invention.

FIG. 2 is a simplified block diagram illustrating a data migration network 200 incorporating an integration hub 210 that is in accord with embodiments of the present invention. Integration hub 210 is coupled via a network to a set of data sources 150(1)-(N). The data sources can store and support data in a variety of different access formats (e.g., tables, queries, PL/SQL, comma-separated variables, text files, and custom formats). To provide access to all these differing formats, integration hub 210 includes a source bridge 220. As will be discussed more fully below, source bridge 220 incorporates a set of source definitions (e.g., SRC DEFN 225) that the source bridge uses to determine an access mode for a requested source. Source bridge 220 then uses the determined access mode to access requested data from a specified source 150. Once the data is accessed, source bridge 210 can modify the data to put the data into a format appropriate for further processing and the modified data is stored by the source bridge in an executable memory 230.

Executable memory 230 is accessible to a task executor module 240. Task executor 240 is configured to execute a data migration task that includes an executable that can access and modify the data stored in the executable memory 230. An executable that is part of a task can be stored in an executables library 250. A task typically includes an executable module configured to perform a desired migration data modification. Once a task is complete, the output of the task from the processed data is provided to a data target 160(1)-(M). As discussed above, data targets 160 are one or more information handling systems configured to store and support the data in a target format for an enterprise. Tasks can be linked together to form task "chains" that determine a flow of a data migration run from data sources 150 to data targets 160.

As illustrated, a data migration mapping can be from a source defined on a target. For example, data mapping sequence 260 maps data target 160(1) to data source 150(1). Alternatively, a data target can point to several sources through additional mapping sequences. For example, data mapping sequence 270 maps data target 160(2) with data source 150(2), while data mapping sequence 280 maps data target 160(2) with data source 150(3). This ability to map multiple sources to a target provides flexibility in data migration flows.

Figure 3:
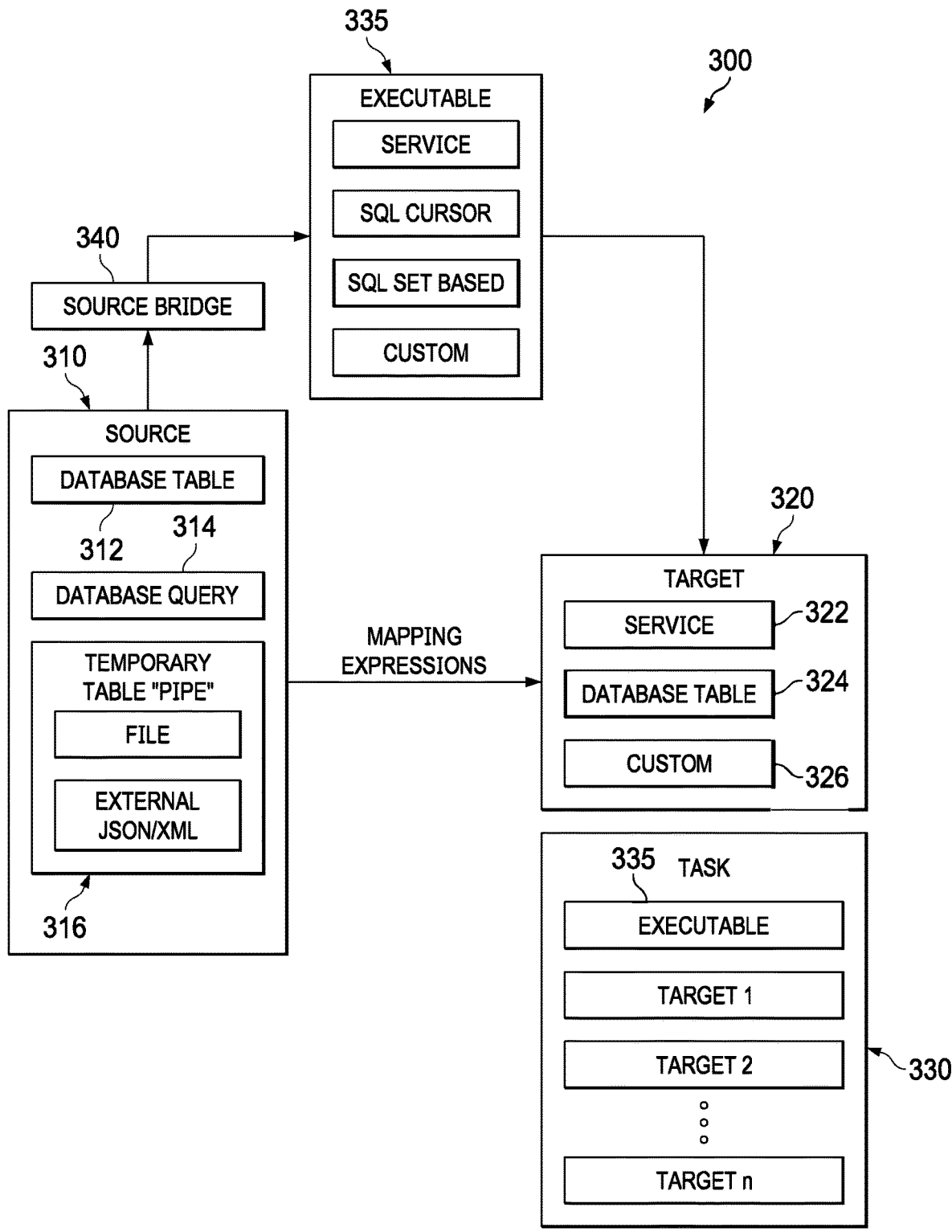
FIG. 3 is a simplified flow diagram illustrating a data migration processing flow 300 in accord with embodiments of the present invention.

FIG. 3 is a simplified flow diagram illustrating a data migration processing flow 300 in accord with embodiments of the present invention. As discussed above, the data migration processing provides for accessing data in one or more data sources 310 and mapping that accessed data to one or more data targets 320. Data sources 310 can take a variety of form and access methods, including, for example, database tables 312, database queries 314, and temporary tables 316 that can include file-based data and other types of data accessed via JSON/XML type data interchange languages. Data targets 320 can also take a variety of forms and can include services 322, database tables 324, and other custom data repositories 326 to which data accessed from the sources can be modified and written.

The integration hub provides mapping expressions that transform the source fields to target fields without concern for where the source data physically resides. Tasks 330 are configured to transform the data through the use of one or more executables 335 and mapping expressions that provide transformation rules. Executables can be modularly designed data conversion routines for one or more target fields. An executable 335 can send a generated query for source information to source bridge 340. The source bridge is configured to provide data to the executable in a format and a location the executable expects. Thus, the source bridge is also configured to communicate with the variety of data sources 310 in a manner transparent to the executables so that the executables can be data source/format agnostic. As discussed herein, source bridge 340 provides such functionality by having the source locations and formats in a source definition database accessible to the source bridge. Once the data source is accessed, the source bridge can also perform preprocessing on the accessed data to put the data in a format expected by the requesting executable. Once executable 335 processes the data, the executable can provide modified data to a linked data target 320.

Figure 4:
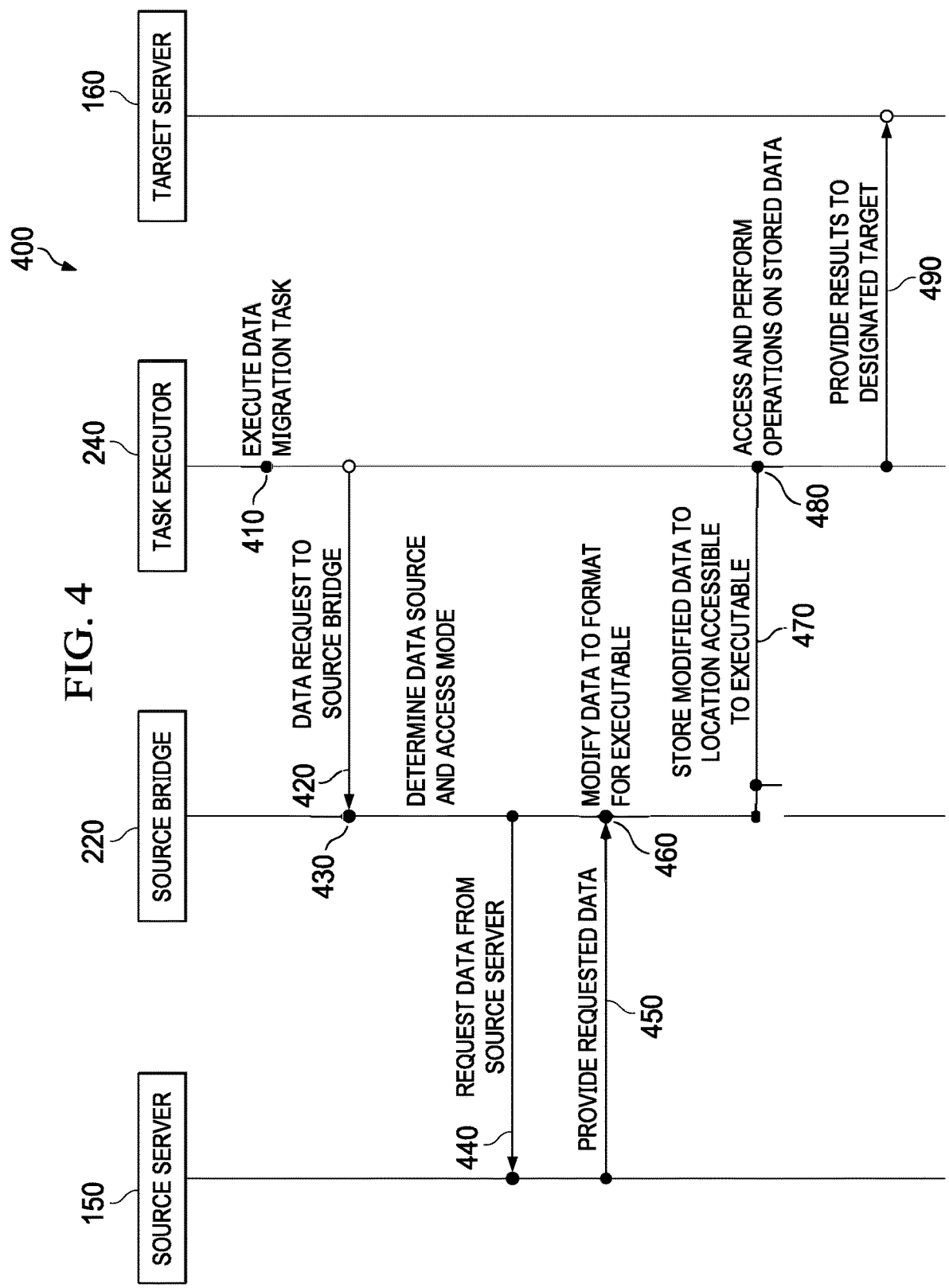
FIG. 4 is a simplified flow diagram 400 illustrating an example of a time sequence of steps executed by an integration hub of embodiments of the present invention.

FIG. 4 is a simplified flow diagram 400 illustrating an example of a time sequence of steps executed by an integration hub of embodiments of the present invention. The task executor module 240 executes a data migration task (410). A data migration task, as discussed above, can include an executable that requests data for access and modifies that data for a data target 160. The task may have one or more linked data targets to which the task and executable are providing the task modified data. The executable can be stored as modules usable by a variety of different tasks and may be usable in different data migration environments. Provision of reusable executables improves data migration debug time because once an executable is validated in one environment, the issues debugged there should not be of issue in subsequent environments. As the data migration task executes, an executable may make a data request to source bridge 220 (420).

Figure 5:
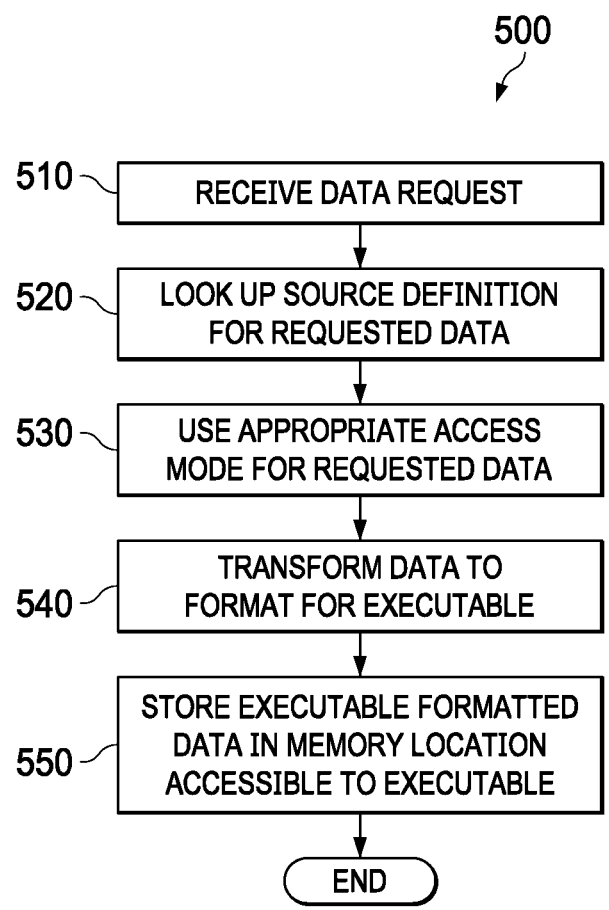
FIG. 5 is a simplified flow diagram illustrating an example of a process flow 500 executed by a source bridge in response to receiving a request for data from an executable.

FIG. 5 is a simplified flow diagram illustrating an example of a process flow 500 executed by a source bridge in response to receiving a request for data from an executable. Upon receipt of the data request (510), source bridge 220 can determine the data source and access mode for that source (430). As discussed above, the source bridge can make this determination by correlating the data request with entries in a source definition table (e.g., SRC DEFN 225) (520). Entries in the source definition table can include, for example, a source server address, identifier of the requested information, identifier of the information at the source server, and other access-related information associated with the source server. Once the data source and access mode information are determined, the source bridge can request the data from the source server (440). Such a request will be in the format expected by the source server (e.g., accessing a table, SQL, JSON request) (530). The source server will then respond by providing the requested data to the source bridge (450).

Upon receipt of the requested data from the source server, the source bridge can transform the data to a format expected by the executable (540). This format can be a general format expected by all executables provided by the data migration hub, or a specific format expected by the calling executable. Information can be provided by the executable as to the format of the information expected during the data request. Once the data is put in the expected format, the source bridge can store the executable formatted data in a memory location accessible to the executable (e.g., executable memory 230) (470/550). The source bridge can be configured to perform these tasks in a manner that efficiently handles multiple requests from executables in executing tasks (e.g., parallel pipelines and the like).

Once the modified data is stored in the memory, the executable can access and perform data migration operations on the stored data (480). Such operations can include format changes, combinations with other data, permutations of the data, and the like. Data can also be determined to be excluded at this stage, or other custom functionality can be included to perform unique processing (e.g., to invoke an external application to determine a value for a field, and the like). As the data migration tasks are performed on the data, the results of the migration operations are provided to the data targets 160 designated by the task (490). The process of accessing, pre-processing, task processing, and storing the data is repeated until the task is complete for all the data desired to be migrated.

As discussed above, embodiments of the data integration hub include a set of executables that can perform operations on the source data as provided by the source bridge. The executables can be linked to other executables and to data targets (e.g., services and database objects) through the use of tasks. For a particular data migration task (e.g., migrating to an ORACLE Revenue Management and Billing [ORMB] system), a data integration hub can be provided to an enterprise customer with a base level set of executables and tasks that are associated with typical migration operations. But for many enterprise environments, there may be customizations in the legacy data source systems or customizations in the new target data sources that are not anticipated by the base level set of executables. In order to provide an ability to modify the data integration hub, embodiments enable one or more customization levels in which the executables, tasks, source and target destinations, fields, and the like, can be modified or created for the enterprise's custom environment.

Figure 6:
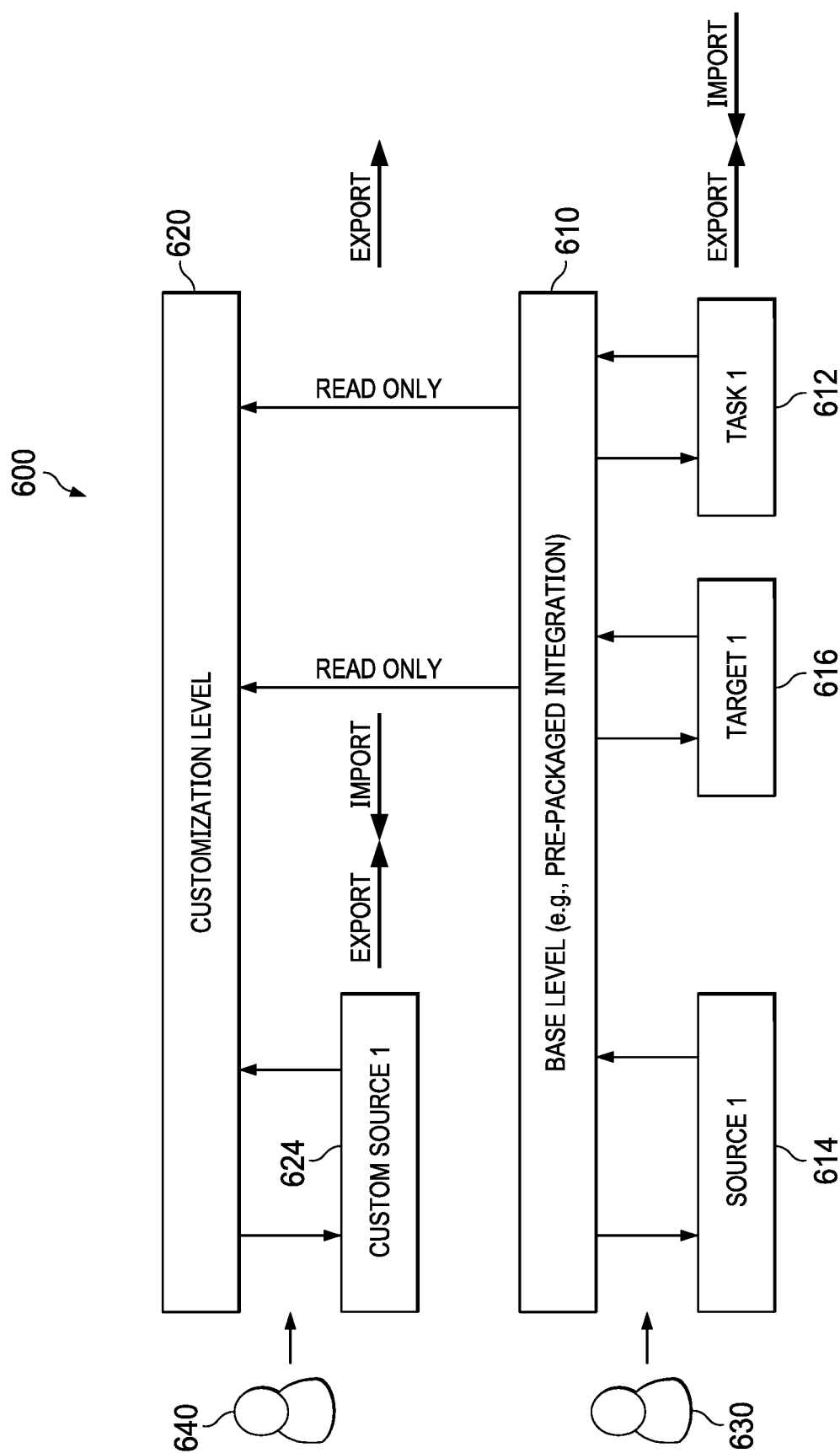
FIG. 6 is a simplified block diagram illustrating an example 600 of customization levels provided by an embodiment of the data integration hub.

FIG. 6 is a simplified block diagram illustrating an example 600 of customization levels provided by an embodiment of the data integration hub. A base level configuration 610 of the data migration hub can include a set of base level tasks 612 associated with predetermined source 614 and target 616 definitions. The base level tasks can each include an executable that performs migration tasks repeatedly used for a particular data target environment. The tasks and executables are pre-packaged with the data integration hub by, for example, a supplier of the data integration hub. In addition, source definitions 614 can include source definitions for source bridge module 122, which may be specified by the enterprise upon ordering of the data migration hub or which are known to be typical of a particular type of data migration. For example, a target in one task can be a source in a subsequent task. If a new identifier (e.g., a customer identifier) is generated for a target, that customer identifier can be provided as a source for other targets. Sources such as this can be pre-packaged as they are derived from base target definitions. Target definitions 616 can be provided for target servers of known configurations (e.g., a typical ORMB environment).

To accommodate an enterprise's custom environment (e.g., sources not included in the base configuration, unique fields in the data source or data target, and the like), embodiments of the data integration hub provide a customization level 620. The customization level has access to all the components of the base level. In addition, the customization level provides for custom components such as custom source 624 that is a replacement for source 614. The rationale for the custom source can include, for example, differing source fields associated with the enterprise's legacy systems, differing source formats from those configured in the base level, and the like. Alternatively, additional tasks or executables can be configured for use in the customization level. It should be noted that creation of a new "source 1" in the customization level does not alter the "source 1" provided in the base level.

The customized modules are only accessible to those who are granted access to the customization level. A first user 630, when accessing the data migration hub, specifies that they are accessing the base level. User 630 then can access only the modules associated with the base level (e.g., task 612, source 614, and target 616). A second user 640, when accessing the data migration hub, specifies that they are accessing the customization level. User 640 can then access the modules associated with the customization level (e.g., custom source 624) and the modules from the base level that are not superseded by the customization level modules (e.g., task 612 and target 616). Embodiments can provide multiple customization levels to handle a variety of projects, as needed. Users can be authorized for specified customization levels, if the enterprise utilizing the data migration hub wishes to limit access for security and functionality reasons. User 640, authorized only for customization level 620, can only modify objects at the customization level, while base level 610 is read only to user 640.

Embodiments of the present data migration system provide flexibility over previous data migration methods which are specifically programmed for each environment in which data migration is needed. Embodiments provide flexibility in terms of a variety of executables stored in the executable library to construct a variety of data migration tasks. In addition, the source bridge provides a connectivity to a variety of data sources and places the data from those sources into a form acceptable for the executables, thereby simplifying tasks related to converting the data. By reusing executables, embodiments also can reduce time needed to program, debug, and execute data migration.

By now it should be appreciated that there has been provided a data migration handling system that includes a task executor module, a memory coupled to the task executor module, and a source bridge module coupled to the task executor module and the memory. The task executor module is configured to execute a data migration task. The source bridge module is configured to receive a request for data from the task executor module, communicate with a data source information handling system using a protocol associated with the data source information handling system to access the requested data in response to the request for data, preprocess the requested data from the data source information handling system to a format associated with the data migration task, and store the preprocessed requested data in the memory.

In one aspect of the above embodiment, the data migration task includes an executable component, and the executable components is configured to process the preprocessed data to a form associated with a data target. In a further aspect, the data migration task further includes a data source identifier and a data target identifier. In another further aspect, the executable component is configured to access the preprocessed requested data from the memory.

In another aspect of the above embodiment, in response to the request for data, the source bridge module is further configured to determine an address of the data source information handling system from the request for data, and access data fields at the data source information handling system in response to the request for data. In a further aspect, the data migration information handling system further includes a second memory coupled to the source bridge that stores a source definition table that includes one or more entries including a source identifier, one or more field identifiers, and access protocol information associated with the identified source. The source bridge module is further configured to perform a lookup of the source definition table to match the address of the data source information handling system and the fields, and determine a protocol associated with the data source information handling system from the matching entry in the source definition table.

In yet another aspect of the above embodiment, the task executor module is configured to execute a plurality of tasks, the plurality of tasks includes a first set of tasks and a second set of tasks, one or more tasks of the second set of tasks are not included in the first set of tasks, the first set of tasks is accessible to a first user account assigned to a first access level, and the second set of tasks is accessible to a second user account assigned to a second access level.

Another embodiment provides a method for migrating data from a data source to a data target. The method includes performing a lookup of access characteristics of the data source in response to a received request for data from a process performing the migration, performing a request for the data from the data source wherein the request for data conforms to the access characteristics of the data source, processing data received from the data source in response to the request for data wherein said processing formats the data to a form required by the process performing the migration, and storing the processed data in a memory accessible to the process performing the migration.

In one aspect of the above embodiment, the access characteristics include one or more of source address, source field identifiers, and source protocol. In a further aspect, the access characteristics are stored in a table having a plurality of entries each of which are associated with an associated data source.

In another aspect of the above embodiment, the method further includes executing the process performing the data migration. The process includes a task including an executable linked to the data source and a data target, and an executable library accessible to the task that stores the executable. In a further aspect, the method includes accessing the processed data by the executable of the task, performing additional processing on the data to place the data in a form associated with the data target, and providing the formatted data to the data target.

Another embodiment provides a method for migrating data from a data source to a data target. The method includes defining a first migration task, where said defining includes selecting an executable component and selecting one or more data target identifiers linked to one or more data source identifiers; executing the first migration task, at a task executor module, where said executing includes, for each data source for each data target, generating a data request for the selected data source; providing, by the task executor module, the data request to a source bridge; requesting, by the source bridge, the data from the data source in a protocol and format required by the data source; and providing, by the source bridge, the data to the task executor module in a form associated with the executable component.

In one aspect of the above embodiment, the method further includes determining by the source bridge the format required by the data source by comparing information provided by the task and a table accessible to the source bridge that includes information associated with one or more data source servers and data fields.

In another aspect of the above embodiment, a first access level provides access to the one or more executable components, data source identifier, and data target identifier. In a further aspect, the method further includes providing a first user access to the first access level. In another further aspect, a second access level provides access to a second set of one or more executable components, data source identifiers, and data target identifiers, and an executable component of the second set of one or more executable components is not comprised in the first access level. In still a further aspect, the method includes providing a second user access to the second access level and not the first access level during modifying of a configuration of the second access level.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 100, for example, from computer readable media such as memory 112 or other media on other computer systems. Such computer readable media may be permanently, removably or remotely coupled to an information processing system such as system 100. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; M RAM; volatile storage media including registers, buffers or caches, main memory, RAM, etc.; and data transmission media including computer networks, point-to-point telecommunication equipment, and carrier wave transmission media, just to name a few.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. For example, more than one customization level can be provided by an implementation of the data migration hub. Alternatively, data source and data target types can extend beyond those described herein. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for migrating data from a data source to a data target, the method comprising:
performing a lookup of access characteristics of the data source in response to a received request for data from a process performing the migration by executing one or more operations associated with executables that are stored in an executables library;
performing a request for the data from the data source wherein the requested data conforms to the access characteristics of the data source, wherein a set of source definitions is implemented to determine access to the source, wherein the data source includes different access formats for different data;

determining the data source and access mode upon receipt of the request for data by correlating the data request with entries in a source definition table, wherein the entries include source server address, identifier of the requested information, identifier of the information at the source server, and other access-related information associated with the source server;

processing data received from the data source in response to the request for data wherein said processing formats the data to an acceptable format required by the process performing the migration;

storing the processed data in a memory accessible to process performing the migration; and performing data migration operations on the stored data that include format changes, combining with other data, permutations of the data, excluding data, and invoking applications to be used on the data.

2. The method for migrating data of claim 1, wherein the access characteristics comprises one or more of source address, source field identifiers, and source protocol.

3. The method for migrating data of claim 2, wherein the access characteristics are stored in a table having a plurality of entries each of which are associated with an associated data source.

4. The method for migrating data of claim 1 further comprising:
executing the process performing the data migration, wherein
the process comprises a task comprising an executable linked to the data source and a data target, an executable library accessible to the task stores the executable.

5. The method for migrating data of claim 4 further comprising:
accessing, by the executable of the task, the processed data;
performing additional processing on the data to place the data in a form associated with the data target;
providing the formatted data to the data target.

6. A method for migrating data from a data source to a data target, the method comprising:
defining a first migration task, wherein said defining comprises selecting an executable component and selecting one or more data target identifiers linked to one or more data source identifiers;
executing the first migration task is performed for each data target identifier and each data source identifier linked to the data target identifier, at a task executor module, wherein said executing comprises:
generating a data request for the selected data source; and
providing, by the task executor module, the data request to a source bridge;
requesting, by the source bridge, the data from the data source in a protocol and format required by the data source, wherein a set of source definitions is implemented to determine access to the source, wherein the data source includes different access formats for different data;
determining the data source and access mode upon receipt of the request for data by correlating the data request with entries in a source definition table, wherein the entries include source server address, identifier of the requested information, identifier of the information at the source server, and other access-related information associated with the source server;
providing, by the source bridge, the data to the task executor module in a format required by the executable component;
storing data in a memory accessible to the process performing data migration; and
performing data migration operations on the stored data that include format changes, combining with other data, permutations of the data, excluding data, and invoking applications to be used on the data.

7. The method for migrating data of claim 6 further comprising:
determining, by the source bridge, the format required by the data source by comparing information provided by the task and a table accessible to the source bridge that includes information associated with one or more data source servers and data fields.

8. The method for migrating data of claim 6, wherein a first access level provides access to the one or more executable components, data source identifier, and data target identifier.

9. The method for migrating data of claim 8 further comprising providing a first user access to the first access level.

10. The method for migrating data of claim 8, wherein
a second access level provides access to a second set of one or more executable components, data source identifiers, and data target identifiers,
an executable component of the second set of one or more executable components is not comprised in the first access level.

11. The method for migrating data of claim 10 further comprising providing a second user access to the second access level and not the first access level during modifying of a configuration of the second access level.

* * * * *